United States Patent
Gong et al.

(10) Patent No.: US 12,177,612 B2
(45) Date of Patent: Dec. 24, 2024

(54) PROJECTION DISPLAY SYSTEM

(71) Applicant: Appotronics Corporation Limited, Shenzhen (CN)

(72) Inventors: Chen-Sheng Gong, Shenzhen (CN); Chen Chen, Shenzhen (CN); Fei Hu, Shenzhen (CN); Xin Yu, Shenzhen (CN); Zu-Qiang Guo, Shenzhen (CN)

(73) Assignee: Appotronics Corporation Limited, Shenzhen (CN)

( * ) Notice: Subject to any disclaimer, the term of this patent is extended or adjusted under 35 U.S.C. 154(b) by 215 days.

(21) Appl. No.: 18/009,692

(22) PCT Filed: Jun. 10, 2021

(86) PCT No.: PCT/CN2021/099516
§ 371 (c)(1),
(2) Date: Dec. 9, 2022

(87) PCT Pub. No.: WO2021/249516
PCT Pub. Date: Dec. 16, 2021

(65) Prior Publication Data
US 2023/0224438 A1    Jul. 13, 2023

(30) Foreign Application Priority Data

Jun. 12, 2020    (CN) .......................... 202010535353.7

(51) Int. Cl.
*H04N 9/31* (2006.01)
*G03B 21/20* (2006.01)
*G03B 33/12* (2006.01)

(52) U.S. Cl.
CPC ......... *H04N 9/3158* (2013.01); *G03B 21/204* (2013.01); *G03B 33/12* (2013.01); *H04N 9/3105* (2013.01); *H04N 9/3161* (2013.01)

(58) Field of Classification Search
CPC ............................. H04N 9/3158; G03B 21/204
See application file for complete search history.

(56) References Cited

U.S. PATENT DOCUMENTS

| | | | |
|---|---|---|---|
| 2009/0190095 A1* | 7/2009 | Ellinger | H04N 13/324 359/464 |
| 2014/0071402 A1* | 3/2014 | Endo | H04N 9/3114 353/7 |

FOREIGN PATENT DOCUMENTS

| | | |
|---|---|---|
| CN | 104412159 A | 3/2015 |
| CN | 204595412 U | 8/2015 |

(Continued)

*Primary Examiner* — Michael H Hong
(74) *Attorney, Agent, or Firm* — ScienBiziP, P.C.

(57) ABSTRACT

A projection display system includes a light source assembly, a wavelength adjusting assembly, and a modulation assembly. The light source assembly is configured to emit projected light. The wavelength adjusting assembly is disposed on an optical path of the projected light for adjusting spectrum of the projected light, and a ratio of luminous efficacy of adjusted projected light to luminous efficacy of monochromatic light corresponding to a dominant wavelength of the projected light is greater than a preset ratio, and color gamut of the adjusted projected light satisfies a preset color gamut coverage. The modulation assembly is disposed on a light exiting path of the wavelength adjusting assembly and configured to modulate light emitted by the wavelength adjusting assembly and output corresponding image light to form projection image.

17 Claims, 9 Drawing Sheets

(56) References Cited

FOREIGN PATENT DOCUMENTS

| | | | |
|---|---|---|---|
| CN | 106154712 | A | 11/2016 |
| CN | 106200217 | A | 12/2016 |

\* cited by examiner

PROJECTION DISPLAY SYSTEM

TECHNICAL FIELD

The disclosure relates to a field of displays, and in particular, to a projection display system.

BACKGROUND

The existing laser projection technology is mainly divided into a projection display system using pure laser light of RGB as a light source and a projection display system using laser light and fluorescent light as the light source. The projection display system using pure laser light of RGB as the light source can obtain a near-total color gamut, but it is difficult to obtain sufficient brightness because of the low luminous efficacy of the red primary color light. The traditional projection display system using laser light and fluorescent light as the light source can display high brightness but usually has a small color gamut. Balancing the brightness and the color gamut has become an urgent problem.

SUMMARY

The present disclosure provides a projection display system, which can balance the brightness and the color gamut of the projection display system.

A technical solution adopted in the present disclosure is to provide a projection display system. The projection system includes a light source assembly, a wavelength adjusting assembly, and a modulation assembly. The light source assembly is configured to emit projected light. The wavelength adjusting assembly is disposed on an optical path of the projected light for adjusting spectrum of the projected light, and a ratio of luminous efficacy of the adjusted projected light to luminous efficacy of monochromatic light corresponding to a dominant wavelength of the projected light is greater than a preset ratio, and color gamut of the adjusted projected light satisfies a preset color range. The modulation assembly is disposed on a light exiting path of the wavelength adjusting assembly and is configured to modulate light emitted by the wavelength adjusting assembly and output light to form a projected image.

The projection display system in the present disclosure includes the light source assembly, the wavelength adjusting assembly, and the modulation component. The light source assembly emits projected light, and the wavelength adjusting assembly can filter the projected light. The modulation assembly modulates the projected light to generate image light. By adjusting spectral composition of the projected light, the ratio of the luminous efficacy of the projected light to the luminous efficacy of the monochromatic light in its main wavelength can be greater than the preset ratio, and the color gamut of the adjusted projected light can satisfy the preset color gamut coverage, achieving balance between the luminous efficacy of the projected light and the color gamut coverage of the projection display system.

BRIEF DESCRIPTION OF THE DRAWINGS

In order to more clearly illustrate technical solutions of embodiments of the present disclosure, the accompanying drawings used in the embodiments are briefly described below. Obviously, the drawings described below are merely a part of the embodiments of the present disclosure. Based on these drawings, those skilled in the art can obtain other drawings without any creative effort. In the drawings:

FIG. 6 (a) is a schematic diagram showing power of each primary color of light when red laser light with different wavelengths is combined into white field;

FIG. 6 (b) is a schematic diagram showing color gamut of white light when the red laser light with different wavelengths is combined into the white field;

DETAILED DESCRIPTION

The technical solutions in the embodiments of the present disclosure are clearly and completely described below with reference to the accompanying drawings in the embodiments of the present disclosure. The described embodiments are merely some rather than all of the embodiments of this disclosure. All other embodiments obtained by those of ordinary skill in the art based on the embodiments of the present disclosure without creative efforts are to fall within the protection scope of the present disclosure.

Figure 1:
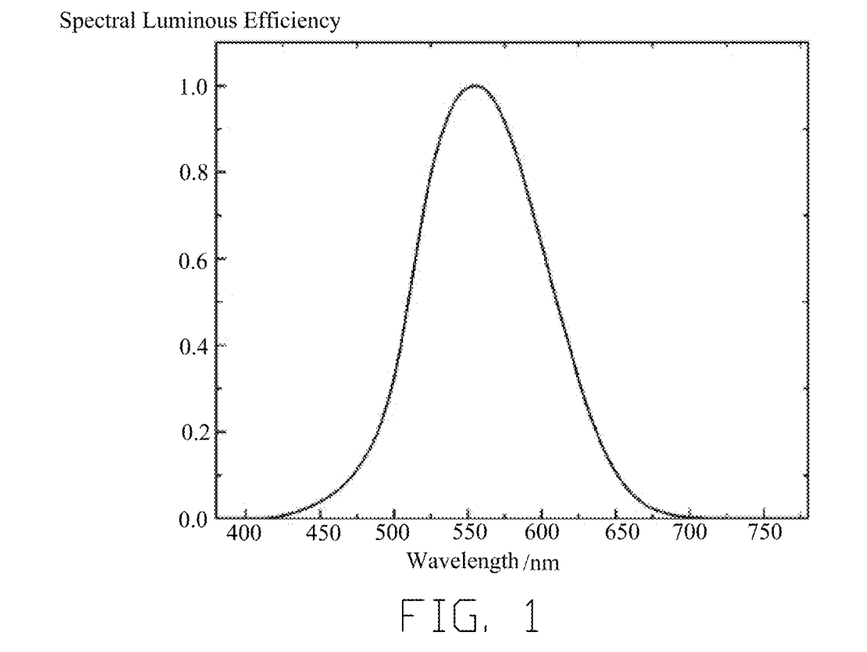
FIG. 1 is a schematic diagram showing a curve of spectral luminous efficiency under photopic vision.

Different wavelengths of light cause different experience in human eyes. For monochromatic light having the same power but different wavelengths, the brightness the human eyes feel different. Through a large number of experimental measurements, in a bright environment (the brightness is greater than 3 cd/m$^2$), sensitivity of the human eyes to light reaches the maximum at the wavelength of 555 nm, and rapidly decreases away from this wavelength. If $P_\lambda$ watt of radiant energy flux within a unit wavelength is equivalent to $\Phi_\lambda$ lumen of luminous flux, its ratio $K_\lambda = \Phi_\lambda / P_\lambda$ represents the number of lumens corresponding to the radiant energy flux of 1 watt. The value K555 corresponding to yellow light with the wavelength of 555 nm is the largest, about 683 lm/W. A ratio of $K_\lambda$ of monochromatic light with any other wavelength to K555 represents relative sensitivity of the human eye to the monochromatic light, this is called spectral luminous efficiency or visibility function, and is represented by $V_\lambda$. That is, $V_\lambda = K_\lambda / K555$. The curve of spectral luminous efficiency under photopic vision as adopted by the International Commission on illumination (CIE) is shown in FIG. 1.

For a light source, the luminous efficacy of the light source is a ratio of the luminous flux emitted by the light source to the luminous power, in lm/W, also known as radiation luminous efficiency of the light source. For a wide-spectrum light source, its luminous efficacy is as follows:

$$K = \frac{K_{555} \int_0^\infty \Phi_e(\lambda) V(\lambda) d\lambda}{\int_0^\infty \Phi_e(\lambda) d\lambda} \quad (1)$$

Wherein, $\Phi_e(\lambda)$ is the radiant energy flux of the light source with wavelength $\lambda$.

Figure 2:
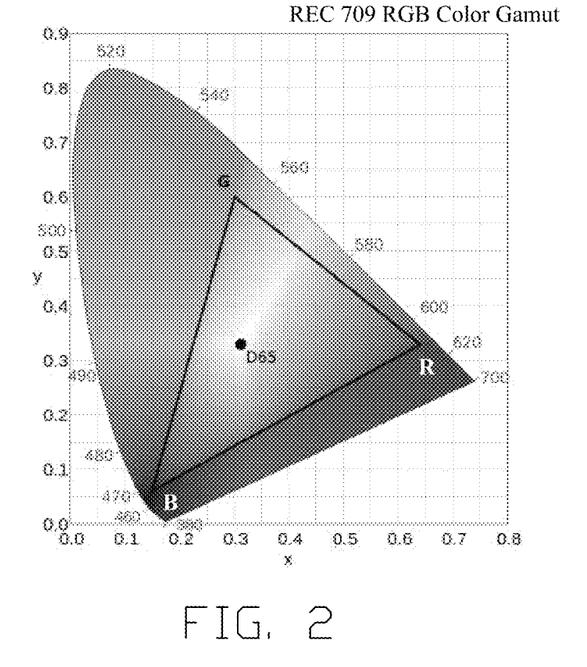
FIG. 2 is a Rec. 709 standard color gamut diagram.

Almost all colors can be obtained by mixing the three primary colors of RGB in a specific ratio. In a display system, combination of light of three colors of RGB is usually used to display various colors, so that the display industry has introduced a variety of color standards, including Rec.709 standards and DCI/P3 standards. Taking the Rec.709 standard as an example, the specified color gamut is a triangular area surrounded by three points with color coordinates R (0.64, 0.33), G (0.30, 0.60), and B (0.15, 0.06) in the CIE 1931 standard, and the recommended color coordinates of the white field are (0.3127, 0.3290), as shown in FIG. 2. If three kinds of light corresponding to three vertex positions in the color coordinates are used as the three primary colors of light of the display system, it can be calculated from the color mixing law that when proportion of brightness of the three primary colors of light is R: 21.3%, G: 71.5%, and B: 7.2% respectively, the recommended white field with coordinates of (0.3127, 0.3290) can be generated.

CIE LUV color space and CIE1931 XYZ color space are uniform color spaces of different standards. Color space coordinates of two color spaces can represent and evaluate colors. A conversion relationship between CIE LUV color space coordinates and CIE1931 XYZ color space coordinates is:

$$\begin{cases} u' = \dfrac{4x}{-2x + 12y + 3} \\ v' = \dfrac{9y}{-2x + 12y + 3} \end{cases}$$

Wherein (x, y) is a coordinate value of CIE1931 XYZ color space, and (u', v') is a coordinate value of CIE LUV color space.

The color gamut coverage can represent the ability of color reproduction of the display device. If it is obtained through testing that the color coordinates of a test center point, where the projector displays pure RGB field, in CIE 1976 standard, are $(u_r', v_r')$, $(u_g', v_g')$, and $(u_b', v_b')$ respectively, then a color gamut area is defined as:

$$S = \frac{|(u_r' - u_b')(v_g' - v_b') - (u_g' - u_b')(v_r' - v_b')|}{2} \quad (2)$$

The color gamut coverage is defined as:

$$G_P = \frac{S}{0.1952} \times 100\% \quad (3)$$

SJ/T 11346-2015 standard requires that the color gamut coverage of projectors should be equal to or greater than 32%, and GB 32028-2015 standard requires that the color gamut coverage of projectors with high color gamut should be equal to or greater than 33%.

The dominant wavelength is used to describe the color of a certain wavelength of light of a pure color corresponding to observed color of light of an impure color. For monochromatic light with a wavelength of $\lambda_d$, if it is mixed with the selected reference white light W in a certain proportion, a color F1 with a certain spectral distribution can be obtained, so the dominant wavelength of the color F1 is $\lambda_d$. Since the spectral locus from 560 nm to 780 nm in the color gamut diagram is a straight line and the color F2 only has this wavelength band as spectral components, the color coordinate of the color F2 is almost the same as that of the corresponding monochromatic light with the dominant wavelength. The spectral components of the red primary color light in the projection display system are often within this wavelength range, so its color can be approximately represented by the dominant wavelength. The dominant wavelength of the red primary color light in the REC.709 color gamut standard is 611 nm, while the dominant wavelength of the red primary color light in the DCI-P3 color gamut standard is 615 nm, and the dominant wavelength of the red primary color light in the REC.2020 color gamut standard is 630 nm.

Figure 3:
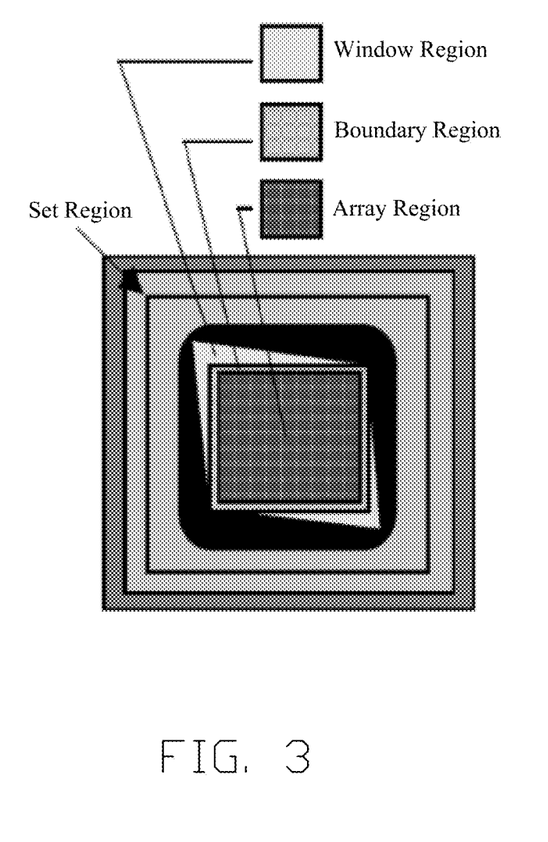
FIG. 3 is a schematic diagram of an illuminated region of incident light on a digital micromirror device (DMD)

The thermal load of a digital micromirror device (DMD) mainly comes from heat loss of incident light on the DMD. FIG. 3 shows a schematic diagram of an illuminated region of the incident light on the DMD. An incident spot of light can be divided into three regions, a part of the spot beyond a reflecting mirror array (window region), an edge part of the reflecting mirror array (boundary region), and an effective area of the reflecting mirror array (array region). An area ratio and absorptivity of the window region in a set region are $x_1$ and $\alpha_1$ respectively. An area ratio and absorptivity of the boundary region in the set region are $x_2$ and $\alpha_2$ respectively. An area ratio and absorptivity of the array region in the set region are $x_3$ and $\alpha_3$ respectively. If the total luminous flux displayed on a screen is $\Phi$, the luminous efficacy is K, and the efficiency of the light incident on the DMD and going on to reach a screen is $\eta_1$, then the thermal load on the DMD is:

$$Q = \frac{\Phi}{K \times \eta_1} \times (x_1 \times \alpha_1 + x_2 \times \alpha_2 + x_3 \times \alpha_3) + Q_{electrical}$$

Wherein $Q_{electrical}$ is a thermal power generated by driving a DMD circuit, and its value is usually much smaller than the heat loss of the incident light on the DMD. It can be concluded that improving luminous efficacy can effectively reduce the thermal load of the DMD. That is, when the thermal load being withstood by the DMD remains unchanged, the total luminous flux displayed on the screen can be effectively increased by improving the luminous efficacy.

Generally, the closer the dominant wavelength of the red primary color light is to 780 nm, the lower the corresponding luminous efficacy will be. The luminous efficacy of the red primary color light will affect the brightness that the projection display system can obtain under same thermal parameters. When the luminous efficacy decreases, the brightness that the display system can obtain will decrease. At the same time, the luminous efficacy becomes lower, and the color gamut coverage of the projection display system becomes larger. The color gamut coverage affects the vividness of the colors of the projection display system. Thus it is necessary to edit the spectrum of the red primary color light (including cutting the spectrum and mixing and superimposing multiple light sources) to better balance the color gamut and brightness and meet application needs.

Figure 4:
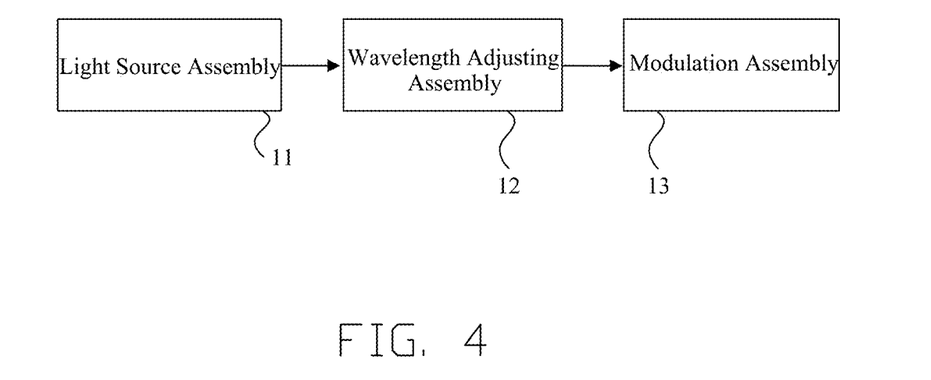
FIG. 4 is a schematic diagram of a projection display system according to a first embodiment of the present disclosure.

Referring to FIG. 4, FIG. 4 is a schematic diagram of a projection display system according to a first embodiment of the present disclosure. The projection display system includes a light source assembly 11, a wavelength adjusting assembly 12, and a modulation assembly 13.

The light source assembly 11 is configured to emit projected light, and the projected light is emitted to the wavelength adjusting assembly 12. The light source assembly 11 can be a light source assembly in which a phosphor material is excited by laser light or a light source assembly of three primary colors of light.

The wavelength adjusting assembly 12 is disposed on an optical path of the projected light. The wavelength adjusting assembly 142 is configured for adjusting spectrum of the projected light to improve the luminous efficacy of the projected light, and the color gamut of the adjusted projected light satisfies a preset color gamut coverage. The wavelength adjusting assembly 12 can be a reflective device or a transmissive device which has wavelength selectivity, including but not limited to, long pass filter, short pass filter, band pass filter, notch filter, dichroic mirror, or polarizing dichroic mirror. In addition, the wavelength adjusting assembly 12 may include a supplemental light source. Wavelength of the supplemental light source can be selected to adjust spectrum of light of corresponding color emitted by the light source assembly 11.

The modulation component 13 is disposed on a light exciting path of the wavelength adjusting assembly 12 and is configured to modulate the light emitted by the wavelength adjusting assembly 12 to obtain corresponding image light. The modulation assembly 13 includes a spatial light modulator. The spatial light modulator can modulate the adjusted projected light emitted by the wavelength adjusting assembly 12 and emit the modulated light.

According to the above formulas (2) and (3), the color gamut coverage is proportional to the color gamut area. When the color coordinates of the light source are changed, corresponding color gamut area is changed, the color gamut coverage is thus changed. Therefore, the color gamut coverage can be adjusted by adjusting the spectrum of the light source. According to formula (1), it can be known that the luminous efficacy of the light source is related to its spectral range. Therefore, the luminous efficacy of the light source can be improved by adjusting the spectrum of the light source, and the luminous efficacy and the color gamut can be balanced.

Figure 5:
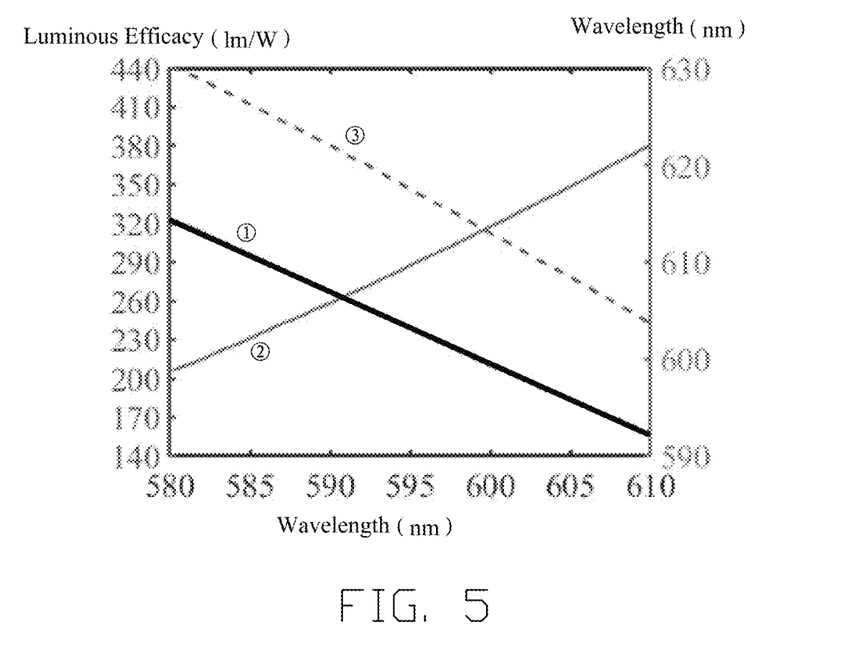
FIG. 5 is schematic diagram showing luminous efficacy of red fluorescent light and a main wavelength and an intercepted wavelength range of the red fluorescent light.

For red fluorescent light intercepted from emission spectrum of a typical yellow phosphor, the luminous efficacy and dominant wavelength of the red fluorescent light are determined by the intercepted wavelength range. The relationship is shown in FIG. 5, curve ① describes the relationship between the luminous efficacy of the red fluorescent light and the intercepted wavelength range, curve ② describes the relationship between the dominant wavelength of the red fluorescent light and the intercepted wavelength range, and curve ③ describes the relationship between luminous efficacy and wavelength of monochromatic light with the same color. The abscissa is the lower limit of the intercepted wavelength range, and the upper limit of the intercepted wavelength range is 780 nm. It can be seen from FIG. 5 that changing the intercepted wavelength range effectively changes the dominant wavelength and luminous efficacy of the red fluorescent light, and the luminous efficacy of red fluorescent light is lower than that of monochromatic light with the same color. With the increase of the lower limit of the intercepted wavelength range, the dominant wavelength of the red fluorescent light is red-shifted, and the luminous efficacy decreases.

Figure 6A:
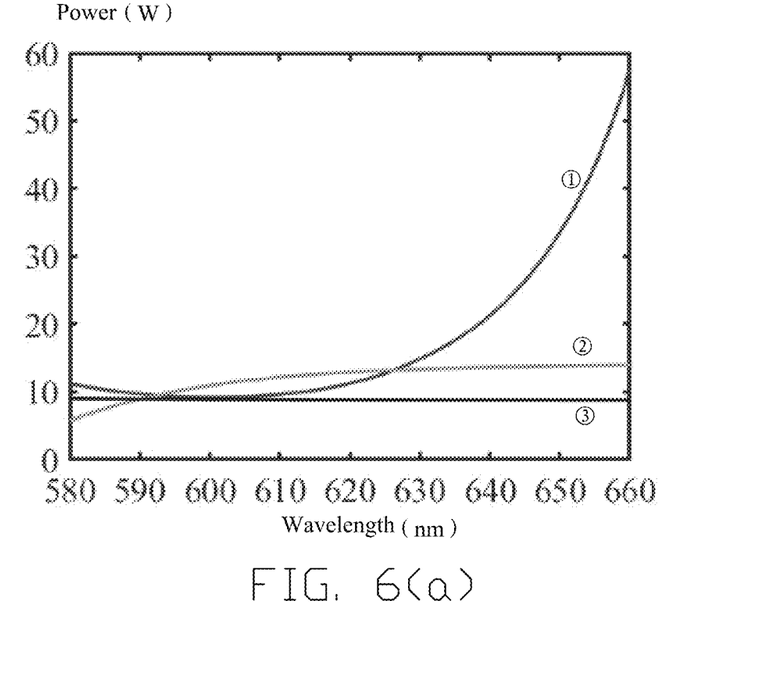
Figure 6B:
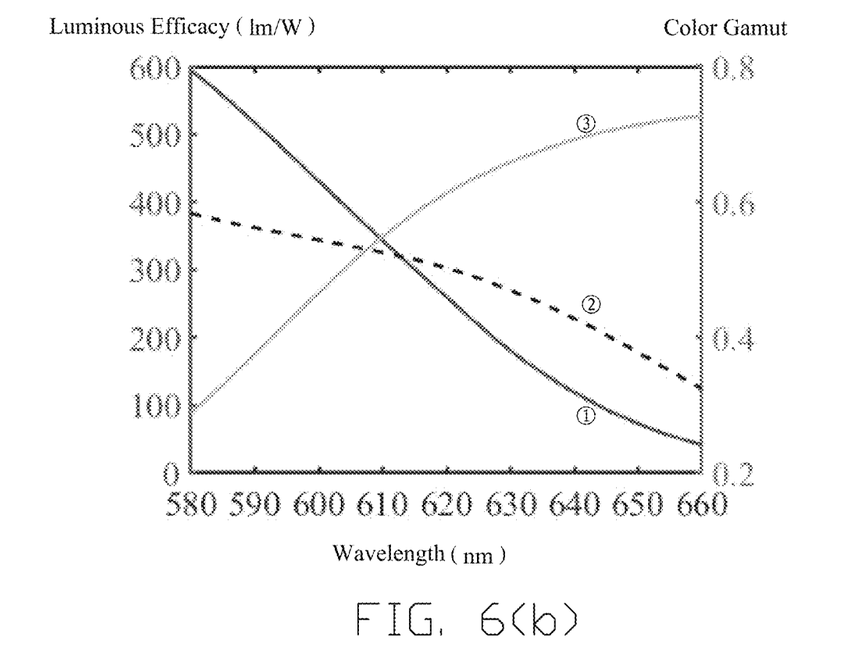

Furthermore, in a pure laser light of RGB display system, a wavelength of green laser light is generally 525 nm, and its color coordinate is (x,y)=(0.114,0.826)), that is, (u, v)=(0.036,0.586), the corresponding luminous efficacy is 541.8 lm/W. A wavelength of blue laser light is generally 455 nm, and its color coordinate is (x,y)=(0.151,0.023)), that is, (u, v)=(0.203,0.070), the corresponding luminous efficacy is 32.8 lm/W. The power and color gamut of each primary color light are shown in FIG. 6 when red laser light beams with different wavelengths are combined to produce a white field with a color coordinate of (x,y)=(0.31,0.33). FIG. 6(a) shows the power of the three primary colors of light when 10000 lm of white light is produced, curve ① is the relationship between the power and wavelength of red laser light, curve ② is the relationship between the power and wavelength of green laser light, and curve ③ is the relationship between the power and wavelength of blue laser light. In FIG. 6(b), curve ①) is the luminous efficacy of red laser light, curve ② is the luminous efficacy of combined white light, and curve ③ is the color gamut coverage. It can be seen from FIG. 6 that the longer the wavelength of the red laser light, the larger the corresponding color gamut; the smaller the luminous efficacy of red light, the smaller luminous efficacy of the combined white light; and the greater the power of the red light required to display white light with the same brightness, the greater the total power of white light will be when displaying white light with the same brightness. According to the above, the dominant wavelength of the red light can affect the luminous efficacy, and the spectrum of the red light can be adjusted to adjust the color gamut and power to achieve balance between the color gamut and the power. In this embodiment, a case where the spectrum of red primary color is adjusted is taken as an example.

Furthermore, as shown in FIG. 6(b), the shorter the wavelength of red light, the smaller the corresponding color gamut. Therefore, in order to meet demand for color gamut coverage, this embodiment of this disclosure makes the spectrum of the red primary color light fall within the preset spectral range, the preset spectral range can be 611 nm to 620 nm. The projected light emitted by the light source assembly 11 covers the spectral range of the three primary colors of light. The projected light can be red primary color light, green primary color light, and blue primary color light, or can be blue primary color light and yellow primary color light. According to the above, changing the intercepted wavelength range can effectively change the dominant wavelength and luminous efficacy of red fluorescent light. However, the luminous efficacy of red fluorescent light is lower than that of monochromatic light with the same color. Thus, in this embodiment, the wavelength adjusting assembly 12 receives the projected light and adjusts the spectrum of the red primary color light contained in the projected light, to cause the dominant wavelength of the adjusted red primary color light to be greater than the color gamut of the REC.709 standard, and the ratio of the luminous efficacy of the red primary color light to the luminous efficacy of the monochromatic light with its dominant wavelength to be greater than 65%.

In this embodiment, the wavelength adjusting assembly 12 can be configured to adjust the spectrum of the red primary color light, so that the dominant wavelength of the red primary color light falls within the preset spectral range, and the ratio of the luminous efficacy of the red primary color to that of the monochromatic light with its dominant wavelength is greater than the preset ratio. This makes the color gamut of the red primary color light exceed the red color gamut of the preset color standard (such as the REC. 709 standard), achieving balance between the luminous efficacy and the color gamut.

Figure 7:
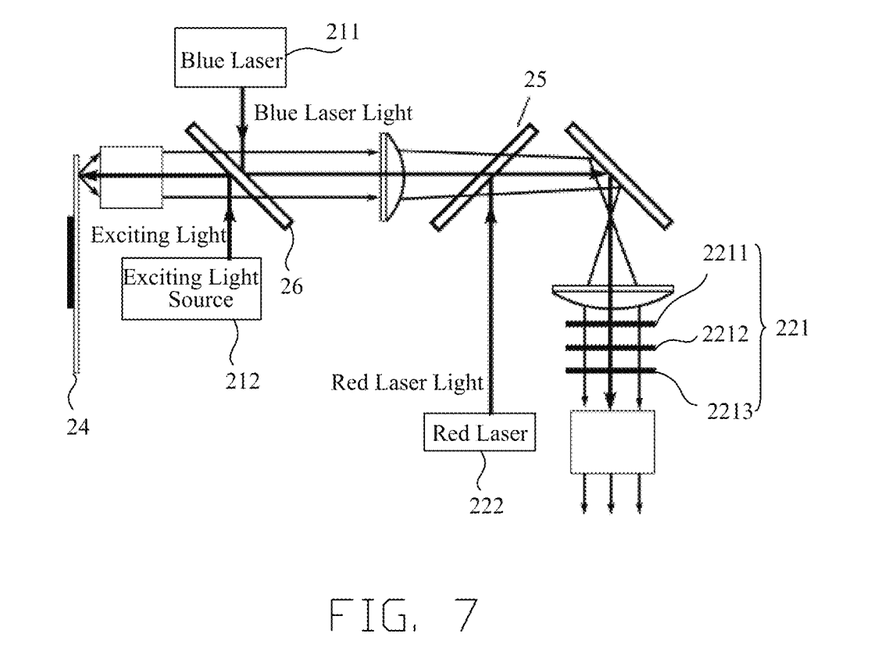
FIG. 7 is a schematic diagram of the projection display system according to a second embodiment of the present disclosure.

Referring to FIG. 7, FIG. 7 is a schematic structural diagram of the projection display system according to a second embodiment of the present disclosure. The projection display system includes a light source assembly, a wavelength adjusting assembly, a modulation assembly, a wavelength conversion device 24, and a transmission reflection element 25. The light source assembly includes a blue laser 211, the blue laser 211 is configured to generate blue laser light. The wavelength adjusting assembly includes a filter assembly 221.

The wavelength conversion device 24 is disposed on the optical path of the projected light and is configured to receive the projected light and generate corresponding excited light. Specifically, the laser light emitted by the blue laser 211 can be used as primary color light, or as exciting light incident to a wavelength conversion region of the wavelength conversion device 24. The wavelength conversion region can receive the projected light and generate the corresponding excited light. Specifically, the wavelength conversion region is provided with a wavelength conversion material capable of converting a wavelength, the wavelength conversion material receives the laser light and emits excited light with a wavelength different from that of the laser light. The wavelength conversion material may be a fluorescent material. Fluorescent materials of different colors can emit fluorescent light with corresponding colors when excited by the exciting light. The fluorescent material can include a yellow fluorescent material or a green fluorescent material.

The projected light includes the red primary color light, and the dominant wavelength of the red primary color light is 611 nm to 620 nm. Preferably, the dominant wavelength of the red primary color light is 611.4 nm, and the preset ratio is 65%. That is, the luminous efficacy of the dominant wavelength of the red primary color light is at least 65% of the luminous efficacy of the monochromatic light with its dominant wavelength. The filter assembly 221 is configured to filter the excited light to obtain green primary color light. The combined light is white light, and the color coordinates of the white light are (0.313, 0.329).

Referring to FIG. 7, the light source assembly further includes an exciting light source 212. The wavelength adjusting assembly further includes a supplementary light source. The supplementary light source is a red laser 222, the red laser 222 is configured to generate red laser light. The exciting light source 212 is configured to generate exciting light.

The blue laser light emitted by the blue laser 211 is used as the blue primary color light. The color coordinates and luminous efficacy of the blue primary color light are (0.136, 0.040) and 50.5 lm/W respectively. The wavelength of the blue primary color light is 465 nm. That is, the blue laser light with a wavelength of 465 nm is used as the blue primary color of light. The blue primary color light is reflected into the subsequent optical path by a mirror 26 which transmits yellow light and reflects blue light. The exciting light source 212 can be a blue laser, and the emission wavelength of the exciting light source 212 is 455 nm. That is, the exciting light with a wavelength of 455 nm can excite the yellow fluorescent material on the wavelength conversion device 24 to generate yellow fluorescent light, and the yellow fluorescent light is transmitted to the subsequent optical path by the mirror 26.

The filter assembly 221 is further configured to filter the excited light to obtain red fluorescent light. The red fluorescent light and red laser light constitute the red primary color light. Specifically, the filter assembly 221 includes a first wavelength adjusting element 2211, a second wavelength adjusting element 2212, and a third wavelength adjusting element 2213.

The first wavelength adjusting element 2211, the second wavelength adjusting element 2212, and the third wavelength adjusting element 2213 are respectively a band-stop filter, a band-stop filter, and a short-pass filter. The wavelength range intercepted by the first wavelength adjusting element 2211 is smaller than the wavelength range intercepted by the second wavelength adjusting element 2212, and the wavelength range intercepted by the second wavelength adjusting element 2212 is smaller than the wavelength range intercepted by the third wavelength adjusting element 2213. Specifically, the first wavelength adjusting element 2211 is a filter with an intercepting wavelength range of 480 nm to 520 nm, the second wavelength adjusting element 2212 is a filter with an intercepting wavelength range of 573 nm to 592 nm, and the third wavelength adjusting element 2213 is a filter with an intercepting wavelength range of 670 nm.

These three groups of wavelength adjusting elements are provided to intercept the yellow fluorescent light to obtain the spectrum in the band of 520 nm to 573 nm as the green primary color light. That is, the wavelength of the green primary color light is 520 nm to 573 nm. The color coordinates and luminous efficacy of the green primary color light are respectively (0.297, 0.687) and 636.0 lm/W. Three groups of wavelength adjusting elements intercept the yellow fluorescent light to obtain the spectrum in the band of 592 nm to 670 nm, which is combined with the red laser light with a wavelength of 638 nm to constitute the red primary color of light by using the transmission reflection element 25 coated with a red reflective film in a small central area. That is, the wavelength range of the red fluorescent light is 592 nm to 670 nm, the wavelength of the red laser light is 638 nm, and the ratio of the luminous flux of the red fluorescent light to the red laser light is 4:1. The color coordinates and luminous efficacy of the red primary color light are (0.670, 0.330) and 236.7 lm/W respectively, and its dominant wavelength is 611.4 nm, exceeding color standard of the red primary color of the REC.709 color gamut. The luminous efficacy of the monochromatic light with this dominant wavelength is 331.5 lm/W, and the luminous efficacy of the red primary color light is about 71.4% of the luminous efficacy of the monochromatic light with its dominant wavelength.

Figure 8:
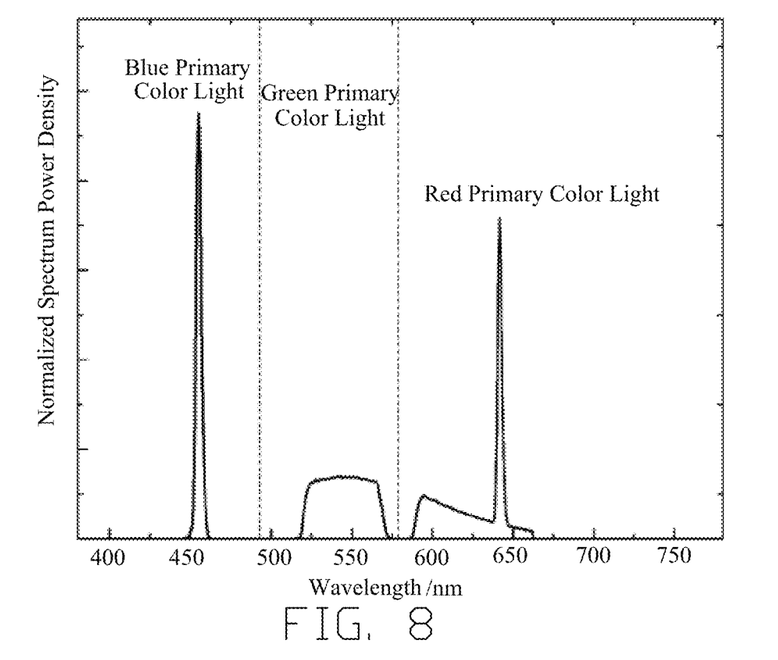
FIG. 8 is a schematic diagram of normalized power spectrum of three primary colors of light in the embodiment shown in FIG. 7.

The normalized power spectrum of the finally obtained three primary colors of light is shown in FIG. 8. When the three primary colors of light are mixed into white light with color coordinates of (0.313, 0.329), the luminous flux ratios of the red primary color light, the green primary color light, and the blue primary color light are 22.9%, 71.9%, and 5.19%, respectively, and the corresponding power ratios are 30.95%, 36.17%, and 32.88%, respectively. The luminous efficacy of the white light is 320.0 lm/W, and the color gamut coverage of the system is 43.05%.

If there are three spatial light modulators in the system to modulate the three primary colors of light respectively, the maximum photothermal load being withstood by the spatial light modulator is $Q_{single}$, and the efficiency of converting optical power into thermal power is $\eta_2$, then the maximum brightness of white light that the system can display is $884.6 \times Q_{single}/\eta_2$, and a high-brightness display is obtained.

Figure 9:
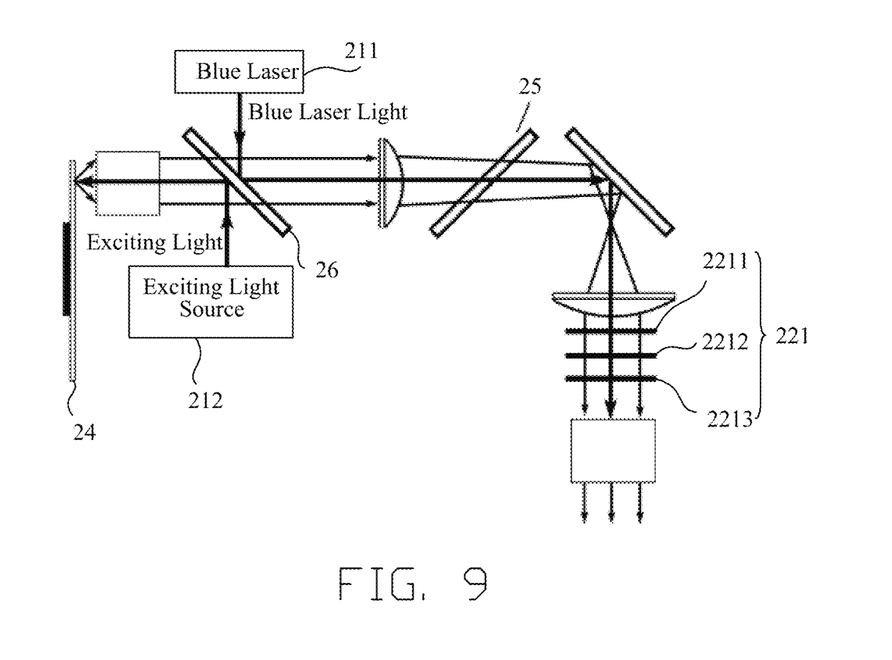
FIG. 9 is a schematic diagram of the projection display system according to a third embodiment of the present disclosure.

In another embodiment, referring to FIG. 9, FIG. 9 is a schematic structural diagram of the projection display system according to a third embodiment of the present disclosure. The difference between this embodiment and the second embodiment of the projection display system is that: the second wavelength adjusting element 2212 is a filter with an intercepting wavelength range of 573 nm to 598 nm, and no red laser is added. In this way, the obtained red primary color light is the fluorescent light in the spectral range of 598 nm to 670 nm in the yellow fluorescent light. That is, the wavelength of the red primary color light is 598 nm to 670 nm, its luminous efficacy is 251.7 lm/W, and the luminous efficacy of the red primary color light is about 75.9% of that of the monochromatic light with its dominant wavelength.

Figure 10:
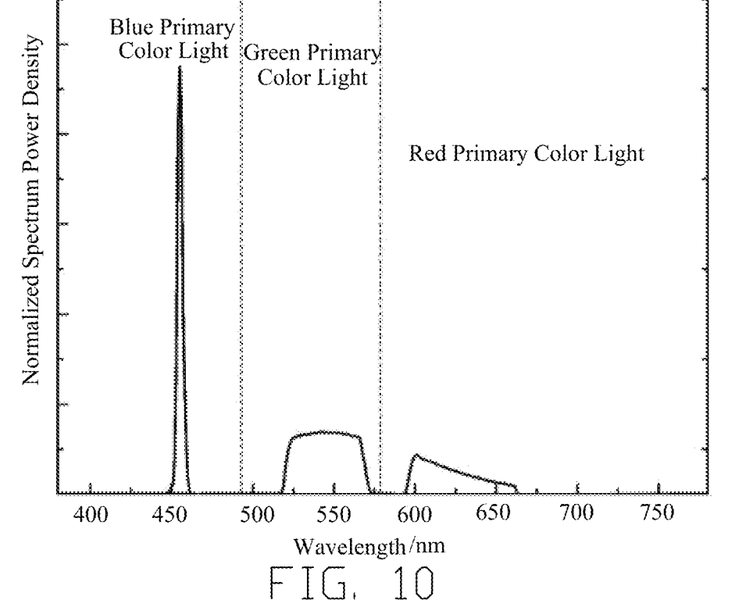
FIG. 10 is a schematic diagram of the normalized power spectrum of the three primary colors of light in the embodiment shown in FIG. 9.

The normalized power spectrum of the three primary colors of light finally obtained is shown in FIG. 10. When the three primary colors of light are mixed into white light with color coordinates of (0.313, 0.329), the luminous flux ratios of the red primary color light, the green primary color light and the blue primary color light are 22.9%, 71.9% and 5.19% respectively, and the corresponding power ratios are 29.65%, 36.85%, and 33.50% respectively. The luminous efficacy of white light is 325.9 lm/W, and the color gamut coverage of the system is 43.05%.

If there are three spatial light modulators in the system to modulate the three primary colors of light respectively, the maximum photothermal load being withstood by the spatial light modulator is $Q_{single}$, and the efficiency of converting optical power into thermal power ism, then the maximum brightness of the white light that the system can display is $884.6 \times Q_{single}/\eta_2$, and a high-brightness display is obtained.

Figure 11:
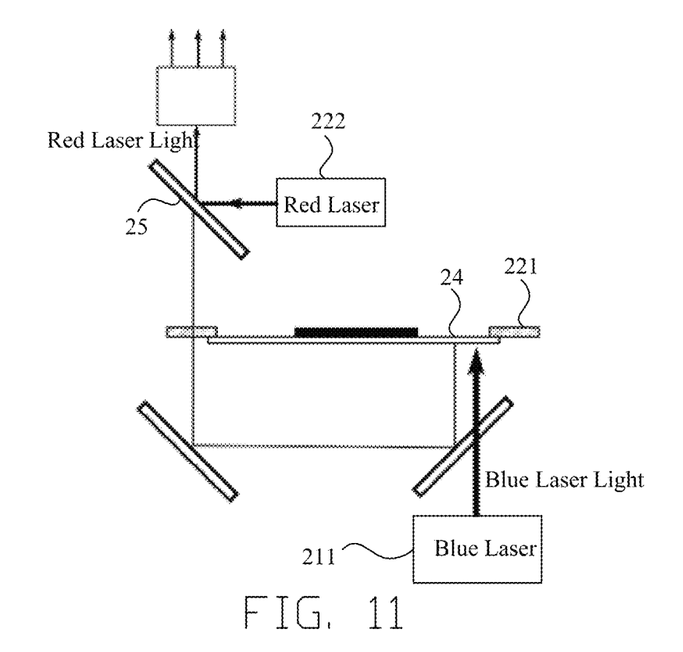
FIG. 11 is a schematic diagram of the projection display system according to a fourth embodiment of the present disclosure.

In another embodiment, FIG. 11 is a schematic structural diagram of the projection display system according to a fourth embodiment of the present disclosure. The blue laser light is used as the blue primary color light and the exciting light, and the excited light includes a first excited light and a second excited light.

Figure 12:
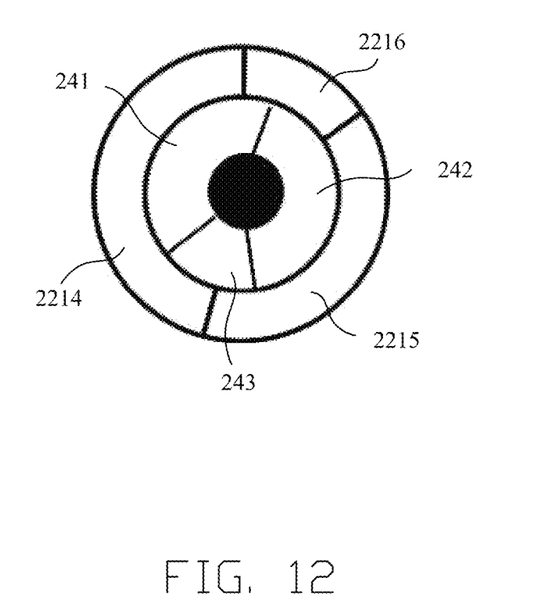
FIG. 12 is a schematic diagram of a wavelength conversion device in the embodiment shown in FIG. 11.

The wavelength conversion device 24 and the filter assembly 221 are respectively arranged at different radii of a color wheel. Specifically, as shown in FIG. 12, both the wavelength conversion device 24 and the filter assembly 221 are ring-shaped structures centered on the axis of the color wheel, the wavelength conversion device 24 includes a wavelength conversion region and a scattering region arranged along a circumferential direction of the wavelength conversion device 24. The wavelength conversion region is provided with a yellow wavelength conversion region 241 and a green wavelength conversion region 242, and the scattering region is provided with a scattering sheet 243. The scattering sheet 243 can scatter the projected light. The wavelength conversion device 24 rotates periodically around the axis of the color wheel, so that the yellow wavelength conversion region 241, the green wavelength conversion region 242, and the scattering sheet 243 periodically and in turn pass through the optical path of the blue laser light, receive the blue laser light, and emit corresponding fluorescent light or scatter the blue laser light accordingly. A fourth wavelength adjusting element 2214, a fifth wavelength adjusting element 2215, and a light transmitting sheet 2216 are arranged on the filter assembly 221 along the circumferential direction of the color wheel, and both the fourth wavelength adjusting element 2214 and the fifth wavelength adjusting element 2215 are bandpass filters.

The fourth wavelength adjusting element 2214 is configured to filter the first excited light to generate red fluorescent light. Specifically, the fourth wavelength adjusting element 2214 is a filter with a wavelength intercepting range of 592 nm to 670 nm. The projected light output from the fourth wavelength adjusting element 2214 is used as red fluorescent light. That is, the fourth wavelength adjusting element 2214 intercepts the part of the yellow fluorescent light with a wavelength of 592 nm to 670 nm as red fluorescent light. By using the transmission reflection element 25 coated with the red reflective film in a central small area, the red fluorescent light can be combined with red laser light with a wavelength of 638 nm to constitute the red primary color light. The ratio of the luminous flux of the red fluorescent light to the red laser light is 4:1. The color coordinates and luminous efficacy of the red primary color light are (0.670, 0.330) and 236.7 lm/W, and its dominant wavelength is 611.4 nm, exceeding the color standard of the red primary color of REC.709 color gamut. The luminous efficacy corresponding to the monochromatic light of this wavelength is 331.5 lm/W, and the luminous efficacy of the red primary color light is about 71.4% of the luminous efficacy of the monochromatic light with its dominant wavelength.

The fifth wavelength adjusting element 2215 is configured to filter the second excited light to generate the green primary color light. Specifically, the fifth wavelength adjusting element 2215 is a filter with an intercepting wavelength range of 490 nm to 580 nm. That is, the fifth wavelength adjusting element 2215 can intercept the wavelength band of 490 nm-580 nm in the green fluorescent light as the green primary color light, and its color coordinates and luminous efficacy are (0.234, 0.680) and 509 lm/W.

The light transmitting sheet 2216 is configured to render the blue laser light scattered by the scattering sheet 243 as the blue primary color light. Specifically, the light transmitting sheet 2216 renders the blue light with a wavelength of 455 nm scattered by the scattering sheet 243 as blue primary color light, and the color coordinates and luminous efficacy of the blue primary color light are (0.151, 0.023) and 32.8 lm/W respectively.

When the three primary colors of light are mixed into the white light with color coordinates of (0.313, 0.329), the luminous flux ratios of the red primary color light, the green primary color light, and the blue primary color light are respectively 26.06%, 71.40%, and 2.53%, and the corresponding power ratios are respectively 33.62%, 42.83%, and 23.55%. The luminous efficacy of the white light is 305.3 lm/W. The color gamut coverage of the system is 48.84%, which is completely covering the REC.709 color gamut. If the maximum total photothermal load being withstood by the spatial light modulator is $Q_{total}$, and the efficiency of converting optical power into thermal power is $\eta_2$, then the maximum brightness of the white light that the system can display is $305.3 \times Q_{total}/\eta_2$.

Figure 13:
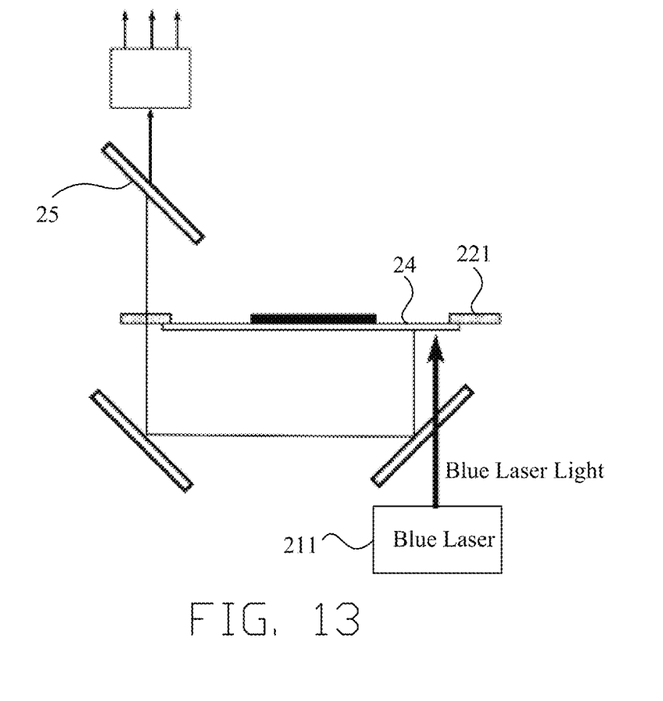
FIG. 13 a schematic diagram of the projection display system according to a fifth embodiment of the present disclosure.

In other specific embodiments, refer to FIG. 13, FIG. 13 a schematic structural diagram of the projection display system according to a fifth embodiment of the present disclosure. The difference between this embodiment and the fourth embodiment of the projection display system is that: the passband of the fourth wavelength adjusting element is 598 nm to 670 nm, the projected light output from the fourth wavelength adjusting element is directly used as the red primary color light, no red laser light being added. The luminous efficacy of the red primary color light is 251.7 lm/W, and the luminous efficacy of the red primary color light is about 75.9% of that of the monochromatic light with its dominant wavelength.

The color coordinates of the red primary color light are (0.670, 0.330). When the three primary colors of light are mixed into the white light with the color coordinates of (0.313, 0.329), the luminous flux ratios of the red primary color light, the green primary color light, and the blue primary color light are respectively 26.06%, 71.40%, and 2.53%, and the corresponding power ratios are respectively 32.26%, 43.71%, and 24.03%. The luminous efficacy of the white light is 311.6 lm/W. The color gamut coverage of the system is 48.84%, which is completely covering the REC.709 color gamut. If the maximum total photothermal load being withstood by the spatial light modulator is $Q_{total}$, and the efficiency of converting optical power into thermal power is $\eta_2$, then the maximum brightness of the white light that the system can display is $311.6 \times Q_{total}/\eta_2$.

In this embodiment, by editing the spectrum of the red primary color light, the dominant wavelength of the red primary color light of the projection display system falls within the range of 610 nm to 620 nm, and the luminous efficacy is at least 65% of the luminous efficacy of the monochromatic light with its dominant wavelength, so that the brightness and color gamut of the projection display system are better balanced.

Figure 14:
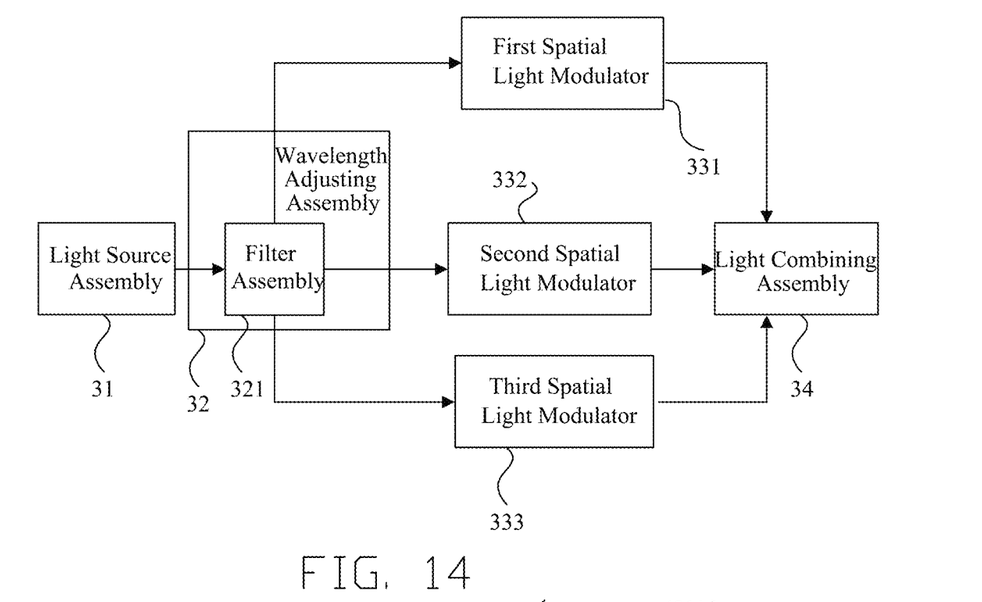
FIG. 14 a schematic diagram of the projection display system according to a sixth embodiment of the present disclosure.

Referring to FIG. 14, FIG. 14 is a schematic diagram of a projection display system according to a sixth embodiment of the present disclosure. Different from the embodiment shown in FIG. 4, the modulation assembly in this embodiment includes a plurality of modulation devices. Specifically, the modulation assembly can include a first spatial light modulator 331, a second spatial light modulator 332, and a third spatial light modulator 333. The three spatial light modulators modulate the three primary colors of light to form red image light, green image light, and blue image light. Therefore, the projection display system in this embodiment further includes a light combining assembly 34.

The light combining assembly 34 is disposed on optical paths of multiple beams of image light and is configured to combine the image light and output the combined light. Image light emitted by the first spatial light modulator 331, the second spatial light modulator 332, and the third spatial light modulator 333 is respectively red primary color light, green primary color light, and blue primary color light. The light combining component 34 combines the red primary color light, the green primary color light, and blue primary color light to generate white light.

Figure 15:
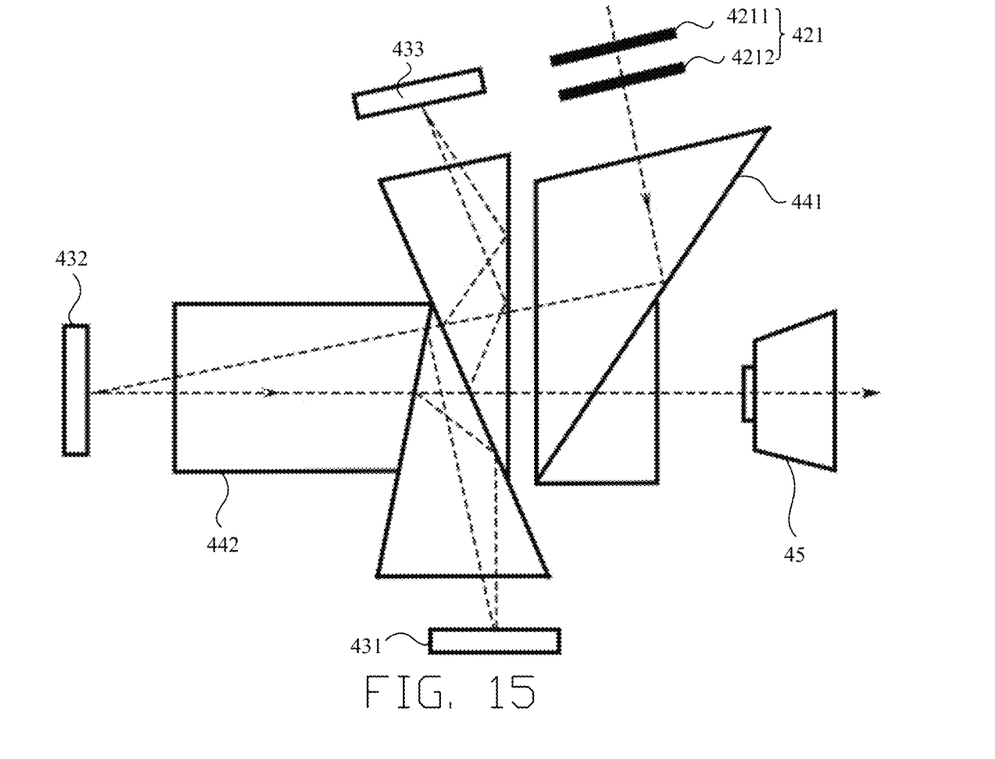
FIG. 15 a schematic diagram of the projection display system according to a seventh embodiment of the present disclosure.

In one embodiment, referring to FIG. 15. FIG. 15 is a schematic structural diagram of the projection display system according to a seventh embodiment of the present disclosure. The projection display system is a three-chip DLP projection display system using a light source in which a phosphor material is excited by a laser light.

In this embodiment, the light combining assembly includes a TIR (Total Internal Reflection) prism 441 and a Philips prism group 442. The light source assembly is omitted in FIG. 15. It can be understood that the structure of the light source assembly can be similar to the structure of the light source assembly in any one of the above embodiments shown in FIG. 4, FIG. 7, FIG. 9, FIG. 11, and FIG. 13, and will not be repeated in this embodiment.

The filter assembly 421 is a wavelength selection element arranged between the light source assembly and the modulation assembly. Specifically, the filter assembly 421 includes a first wavelength selection element 4211 and a second wavelength selection element 4212 sequentially arranged along the optical path.

The projected light emitted from the light source assembly is incident to the first wavelength selection element 4211 and the second wavelength selection element 4212, for spectrum adjustment. After the spectrum adjustment is performed, the projected light enters the Philips prism group 442 after total reflected by the TIR prism 441, and the Philips prism group 442 splits the projected light into the first spatial light modulator 431, the second spatial light modulator 432, and the third spatial light modulator 433. The first spatial light modulator 431, the second spatial light modulator 432, and the third spatial light modulator 433 respectively modulate the red primary color light, the green primary color light, and the blue primary color light to obtain corresponding red image light, green image light, and blue image light. Further, the blue image light, the red image light and the green image light are combined by the Philips prism group 442 and the combined light is then emitted to the imaging optical system 45 for image display on the projection screen.

Figure 16:
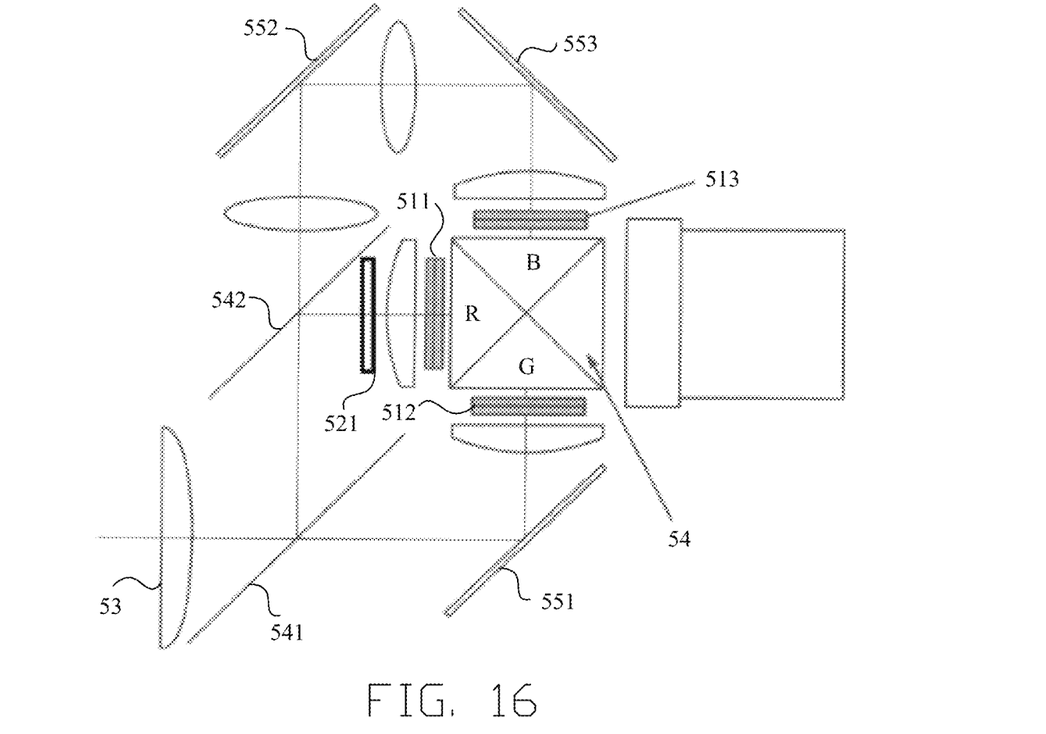
FIG. 16 a schematic diagram of the projection display system according to an eighth embodiment of the present disclosure.

In another embodiment, referring to FIG. 16, FIG. 16 is a schematic structural diagram of the projection display system according to an eighth embodiment of the present disclosure. The projection display system is an LCD (Liquid Crystal Display) projection display system.

In this embodiment, the modulation assembly includes a first spatial light modulator 511, a second spatial light modulator 512, and a third spatial light modulator 513. The first spatial light modulator 511, the second spatial light modulator 512, and the third spatial light modulator 513 respectively modulate the red primary color light, the green primary color light, and the blue primary color light to obtain corresponding red image light, green image light, and blue image light. The light source assembly is omitted in FIG. 16. It can be understood that the structure of the light source assembly can be similar to the structure of the light source assembly in any one of the above embodiments shown in FIG. 4, FIG. 7, FIG. 9, FIG. 11, and FIG. 13, and will not be repeated in this embodiment.

As shown in FIG. 16, the wavelength adjusting assembly includes a filter assembly 521. The filter assembly 521 is arranged between a second dichroic mirror 542 and the first spatial light modulator 511. The projected light is incident to a first dichroic mirror 541 after passing through a focusing lens 56. The first dichroic mirror 541 is configured to transmit green light and reflect light of other wavelength bands, so that the projected light is divided into green primary color light and mixed light of blue primary color light and red primary color light after passing through the first dichroic mirror 541. The green primary color light is further incident to the second spatial light modulator 512 after being reflected by a reflecting mirror 551, and the mixed light of the blue primary color light and the red primary color light is further incident to the second dichroic mirror 542. The second dichroic mirror 542 is configured to reflect red light and transmit light of other wavelength bands, so that the red primary color light is reflected and incident to the first spatial light modulator 511, and the blue primary color light is transmitted to be reflected by a reflecting mirror 552 and a reflecting mirror 553 to the third spatial light modulator 513.

Figure 17:
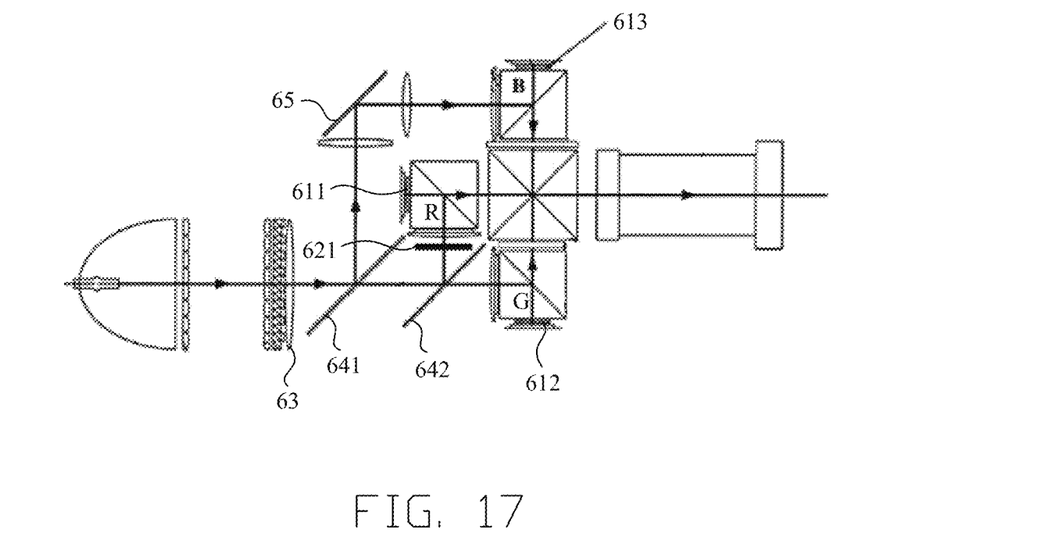
FIG. 17 a schematic diagram of the projection display system according to a ninth embodiment of the present disclosure.

In yet another embodiment, referring to FIG. 17, FIG. 17 is a schematic structural diagram of the projection display system according to a ninth embodiment of the present disclosure. The projection display system may be an LCOS (Liquid Crystal on Silicon) system. Parameters of the first dichroic mirror, the second dichroic mirror and the filter assembly are the same as those of the embodiment shown in FIG. 16, and the working principles are similar, so details will not be repeated here.

In this embodiment, the modulation assembly includes a first light modulator 611, a second light modulator 612, and a third light modulator 613. The first light modulator 611, the second light modulator 612, and the third light modulator 613 respectively modulate the red primary color light, the green primary color light, and the blue primary color light to obtain corresponding red image light, green image light, and blue image light. The light source assembly is omitted in FIG. 17. It can be understood that the structure of the light source assembly can be similar to the structure of the light source assembly in any one of the above embodiments shown in FIG. 4, FIG. 7, FIG. 9, FIG. 11, and FIG. 13, the difference is that the projected light emitted from the light source assembly in this embodiment is polarized projected light, so details will not be repeated in this disclosure.

As shown in FIG. 17, the wavelength adjusting assembly includes a filter assembly 621. The filter assembly 621 is arranged between a second dichroic mirror 642 and the first spatial light modulator 611. The polarized projected light is incident to a first dichroic mirror 641 after passing through a focusing lens 63. The first dichroic mirror 641 is configured to reflect blue light and transmit light of other wavelength bands, so that the polarized projected light is divided into blue primary color light and mixed light of red primary color light and green primary color light after passing through the first dichroic mirror 641. The blue primary color light is further incident to the third light modulator 613 after being reflected by a reflecting mirror 65, and the mixed light of the red primary color light and the green primary color light is further incident to the second dichroic mirror 642. The second dichroic mirror 642 is configured to reflect red light and transmit light of other wavelength bands, so that the red primary color light is reflected and incident to the first light modulator 611, and the green primary color light is transmitted to and incident on the second light modulator 612.

The above are only embodiments of the present disclosure which do not limit the patent scope of the present disclosure, and any equivalent structure or equivalent process made based on the description and drawings of the present disclosure, or those directly or indirectly applied in other related technical fields, are all included in the scope of patent protection of the present disclosure.

What is claimed is:

1. A projection display system, comprising:
a light source assembly configured to emit projected light;
a wavelength adjusting assembly disposed on an optical path of the projected light, wherein the wavelength adjusting assembly is configured for adjusting spectrum of the projected light, a ratio of luminous efficacy of adjusted projected light to luminous efficacy of monochromatic light corresponding to a dominant wavelength of the projected light is greater than a preset ratio, and color gamut of the adjusted projected light satisfies a preset color gamut coverage; and
a modulation assembly disposed on a light exiting path of the wavelength adjusting assembly, the modulation assembly being configured to modulate light emitted by the wavelength adjusting assembly and output corresponding image light.

2. The projection display system according to claim 1, further comprising a light combining assembly, wherein the light combining assembly is disposed on optical paths of multiple beams of image light and is configured to combine the multiple beams of image light and output combined light.

3. The projection display system according to claim 1, wherein the projected light comprises red primary color light with a dominant wavelength range of 611 nm to 620 nm, the preset ratio is 65%.

4. The projection display system according to claim 1, further comprising a wavelength conversion device disposed on the optical path of the projected light, the wavelength conversion device being configured to receive the projected light and generate corresponding excited light.

5. The projection display system according to claim 2, wherein the modulation assembly comprises a first spatial light modulator, a second spatial light modulator, and a third spatial light modulator; the first spatial light modulator, the second spatial light modulator, and the third spatial light modulator are configured to modulate three primary colors of light emitted by the wavelength adjusting assembly to form red image light, green image light, and blue image light; and the light combining assembly is configured to combine multiple beams of the red image light, the green image light, and the blue image light and output the combined light.

6. The projection display system according to claim 4, the light source assembly comprising a blue laser for generating blue laser light, the wavelength adjusting assembly comprising a filter assembly for filtering the excited light to obtain green primary color light.

7. The projection display system according to claim 6, the wavelength adjusting assembly further comprising a red laser for generating red laser light, the filter assembly being further configured for filtering the excited light to obtain red fluorescent light, the red fluorescent light and the red laser light combining red primary color light.

8. The projection display system according to claim 6, the filter assembly comprising a first wavelength adjusting element, a second wavelength adjusting element, and a third wavelength adjusting element, wherein a wavelength range intercepted by the first wavelength adjusting element is smaller than a wavelength range intercepted by the second wavelength adjusting element, and the wavelength range intercepted by the second wavelength adjusting element is smaller than a wavelength range intercepted by the third wavelength adjusting element.

9. The projection display system according to claim 6, wherein a wavelength conversion region and a scattering sheet are arranged on the wavelength conversion device, the wavelength conversion region is configured to receive the projected light and generate corresponding excited light, the scattering sheet is configured to scatter the projected light.

10. The projection display system according to claim 6, wherein the blue laser is configured to generate the blue laser light as blue primary color light which has a wavelength different from a wavelength of the projected light.

11. The projection display system according to claim 6, wherein the wavelength conversion device and the filter assembly are respectively arranged at different radii of a color wheel.

12. The projection display system according to claim 7, further comprising a transmission reflection element, wherein a red reflective film is coated on a central area of the transmission reflection element, the red reflective film is configured to reflect the received red laser light.

13. The projection display system according to claim 7, wherein a wavelength range of the red fluorescent light output by the filter assembly is 592 nm to 670 nm, a wavelength of the red laser light generated by the wavelength adjusting assembly is 638 nm, and a ratio of a luminous flux of the red fluorescent light to the red laser light is 4:1.

14. The projection display system according to claim 8, wherein the first wavelength adjusting element is a band-stop filter, the second wavelength adjusting element is a band-stop filter, and the third wavelength adjusting element is a short-pass filter.

15. The projection display system according to claim 9, wherein the excited light comprises a first excited light and a second excited light, a fourth wavelength adjusting element, a fifth wavelength adjusting element, and a light transmitting sheet are arranged on the filter assembly; the fourth wavelength adjusting element is configured to filter the first excited light, the fifth wavelength adjusting element is configured to filter the second excited light to generate green primary color light, the light transmitting sheet is configured to make blue laser light scattered by the scattering sheet as blue primary color light.

16. The projection display system according to claim 9, wherein both the wavelength conversion device and the filter assembly are ring-shaped structures centered on an axis of a color wheel, the conversion region and the scattering sheet are arranged along a circumferential direction of the wavelength conversion device, and the wavelength conversion device is capable of rotating periodically around the axis of the color wheel.

17. The projection display system according to claim 5, wherein the first spatial light modulator, the second spatial light modulator, and the third spatial light modulator are digital mirror device (DMD) spatial light modulators, liquid crystal on silicon (LCOS) spatial light modulators, or liquid crystal display (LCD) spatial light modulators.

* * * * *